June 28, 1966  R. M. SHAVER  3,257,844
SILL TESTING MECHANISM FOR CUSHION CARS
Filed Feb. 24, 1964  9 Sheets-Sheet 1
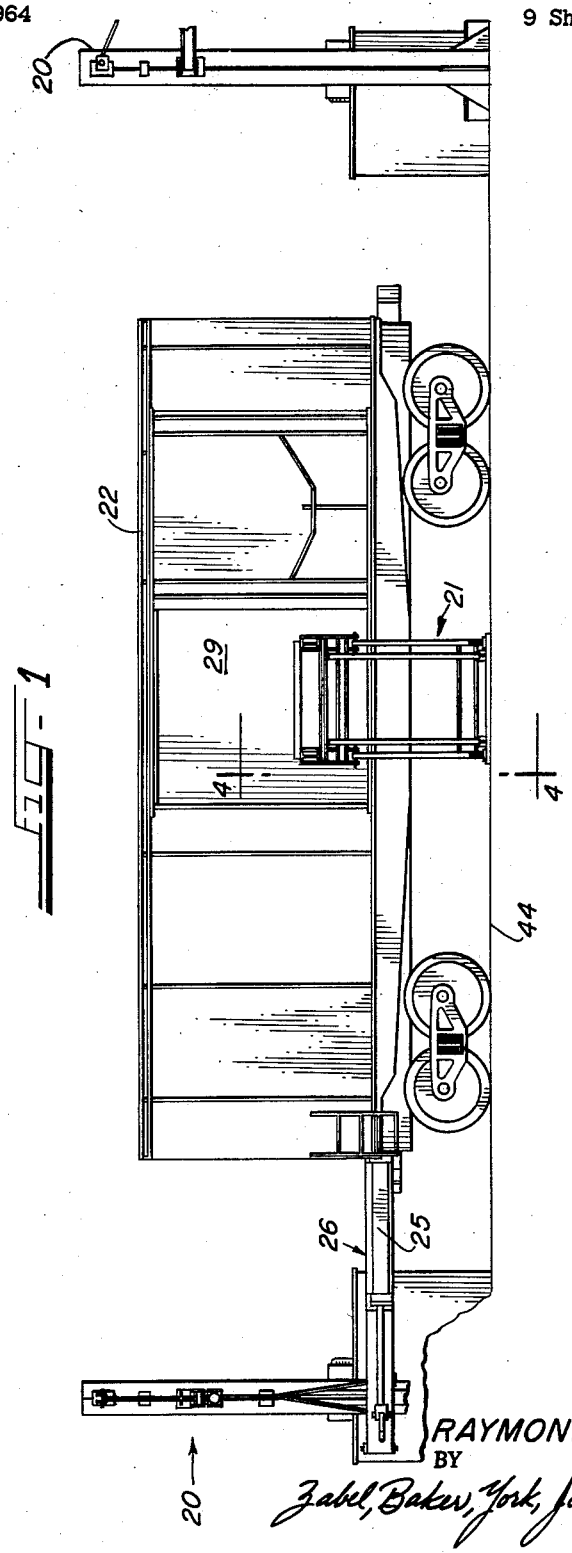
INVENTOR.
RAYMOND M. SHAVER
BY June 28, 1966 R. M. SHAVER 3,257,844
SILL TESTING MECHANISM FOR CUSHION CARS
Filed Feb. 24, 1964 9 Sheets-Sheet 2
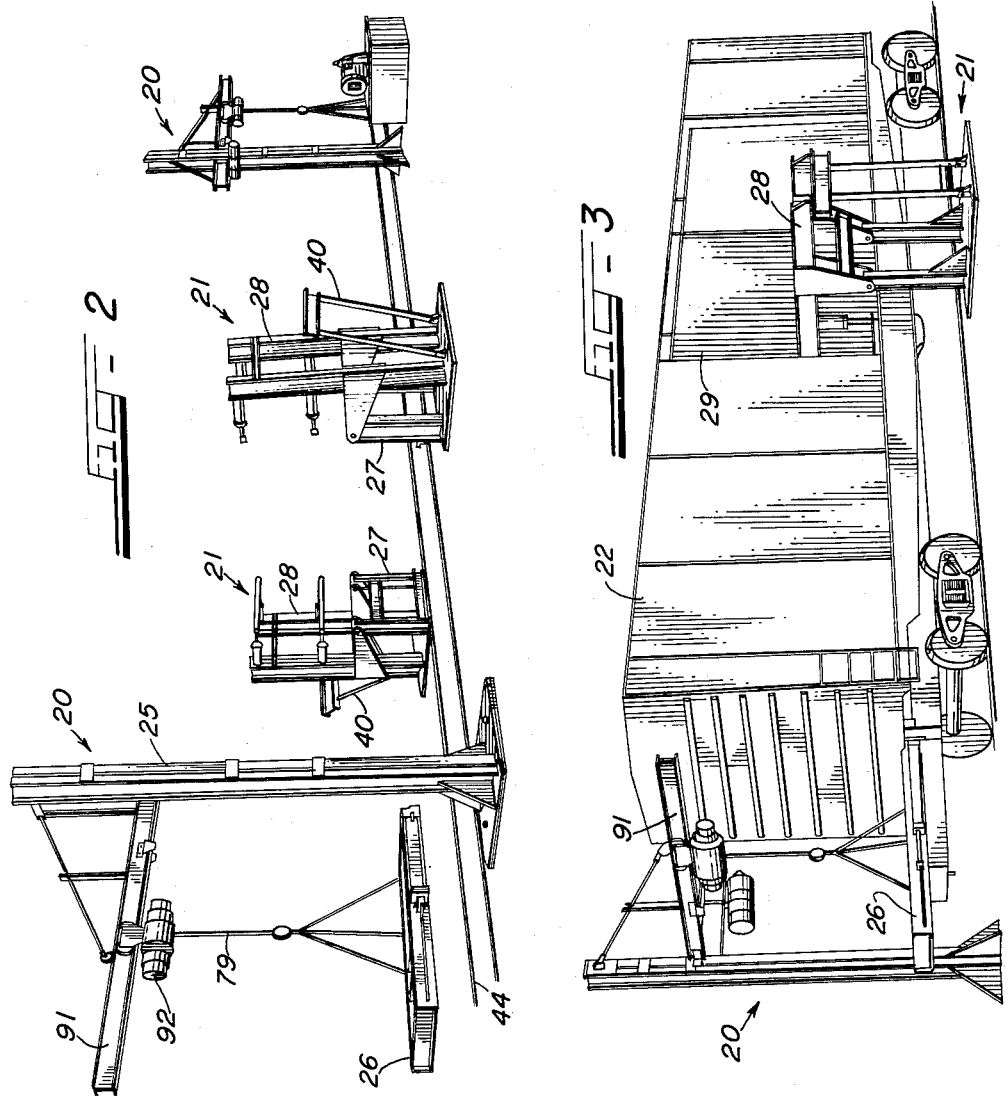
INVENTOR.
RAYMOND M. SHAVER

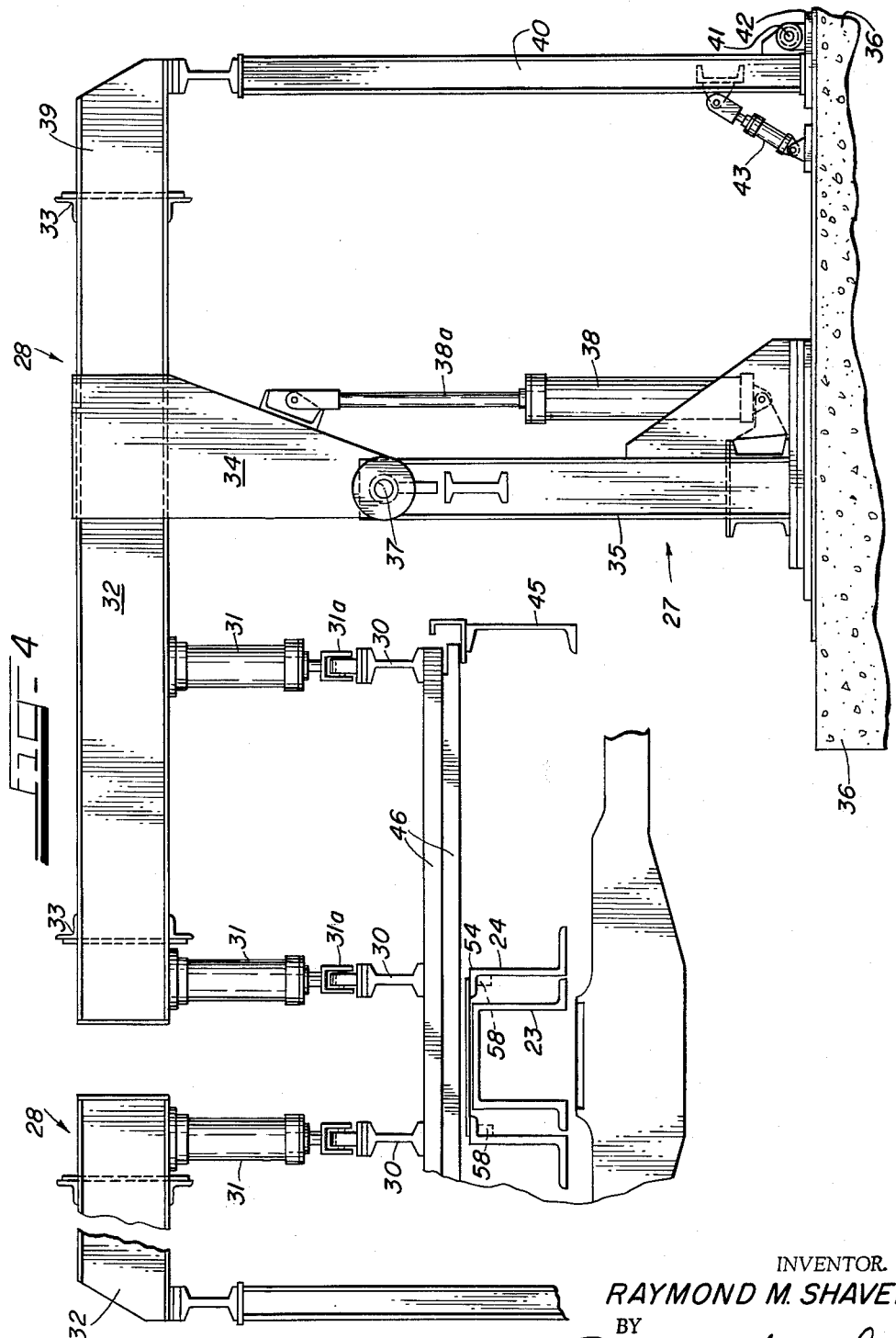

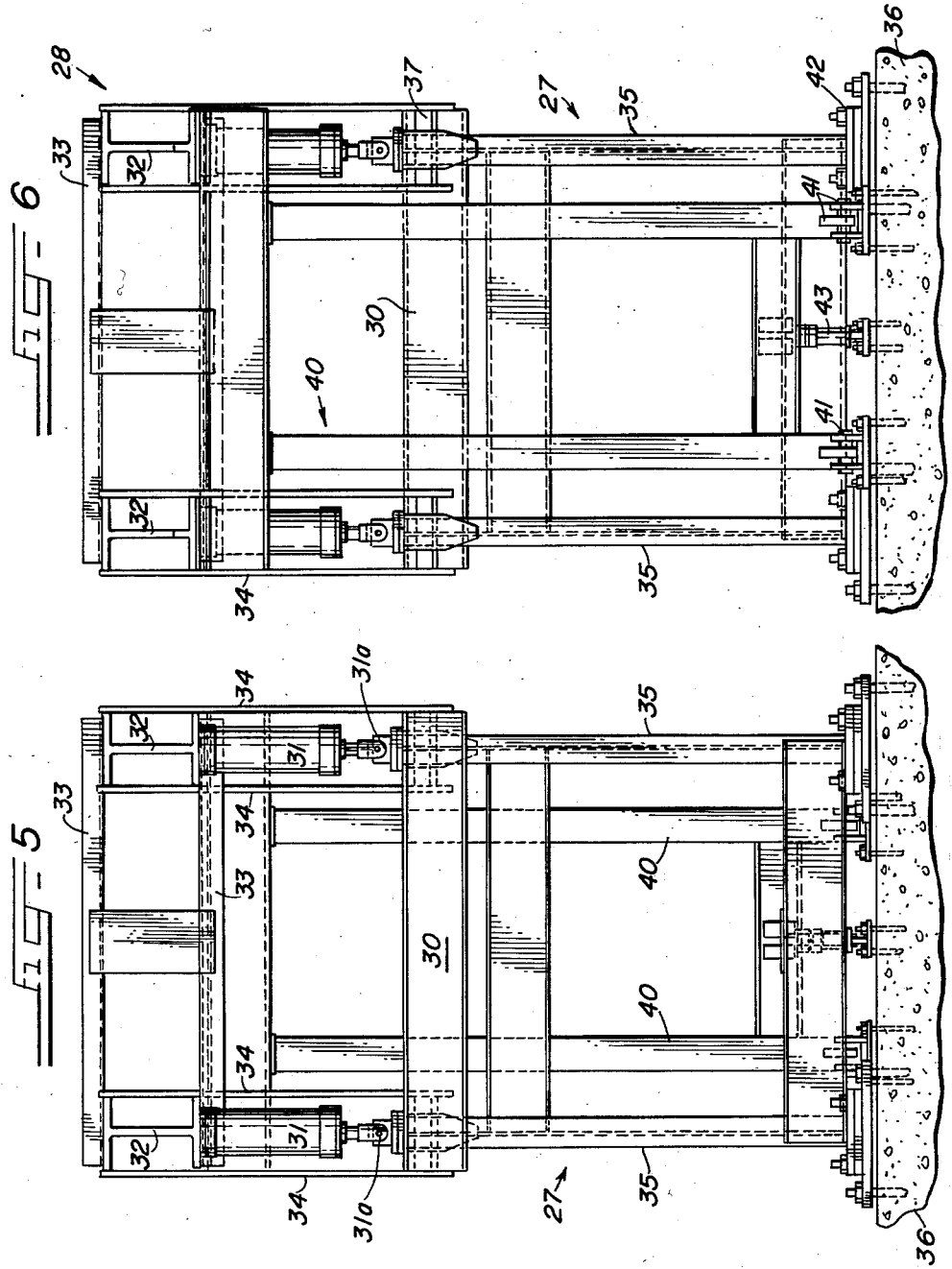

June 28, 1966  R. M. SHAVER  3,257,844
SILL TESTING MECHANISM FOR CUSHION CARS
Filed Feb. 24, 1964  9 Sheets-Sheet 5
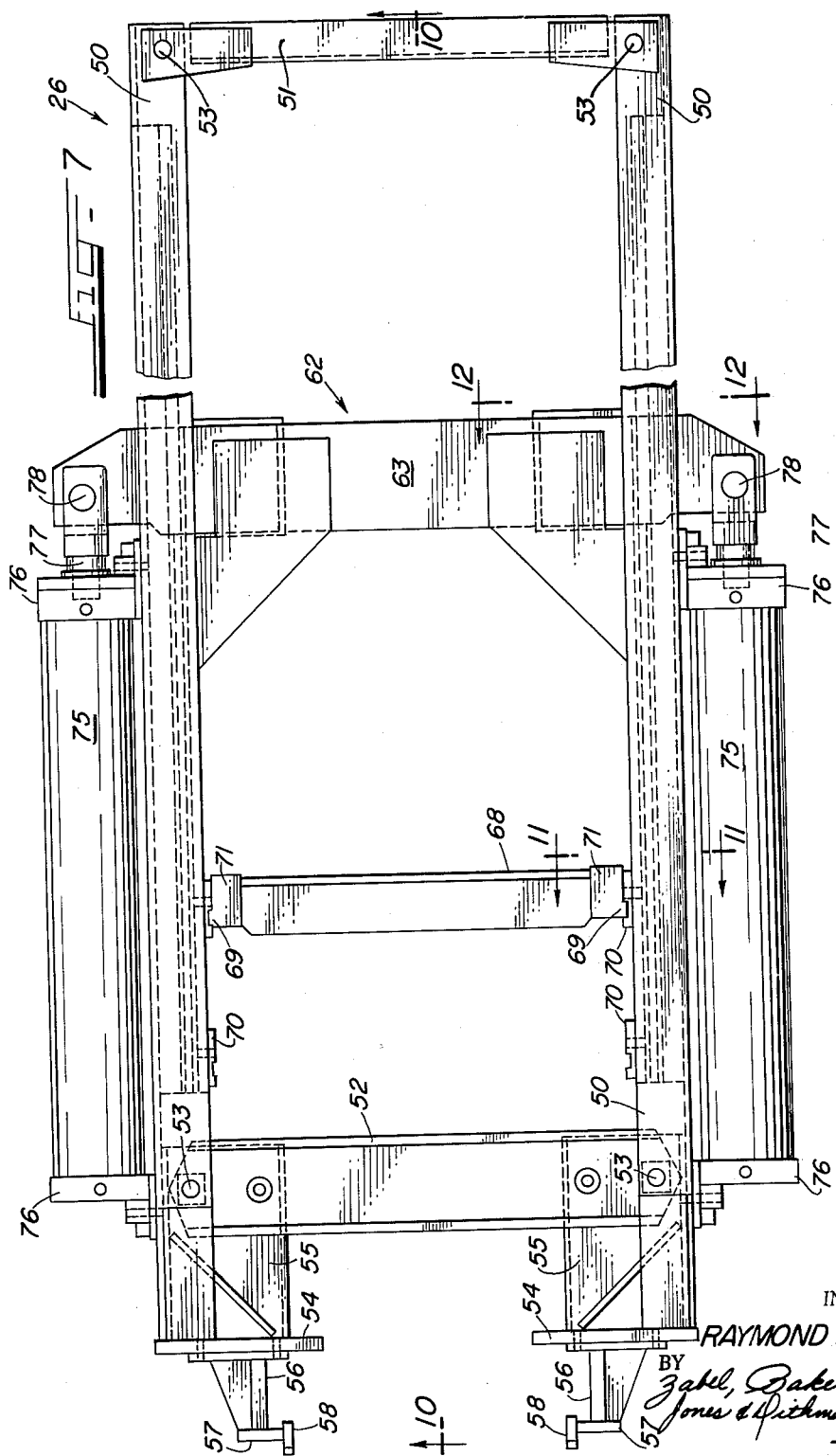
INVENTOR.
RAYMOND M. SHAVER
BY Zabel, Baker, York
Jones & Dithmar

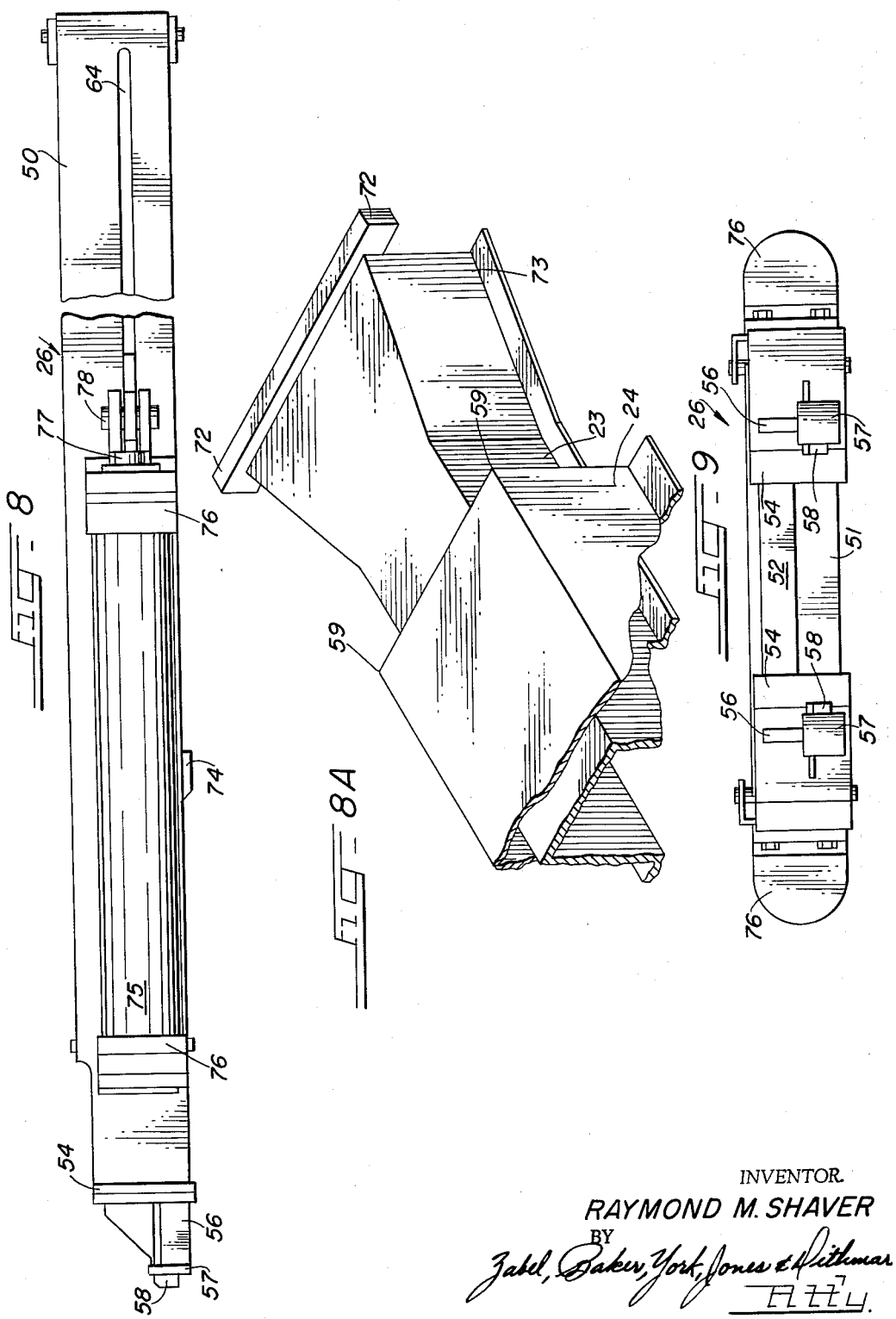

June 28, 1966 R. M. SHAVER 3,257,844
SILL TESTING MECHANISM FOR CUSHION CARS
Filed Feb. 24, 1964 9 Sheets-Sheet 7
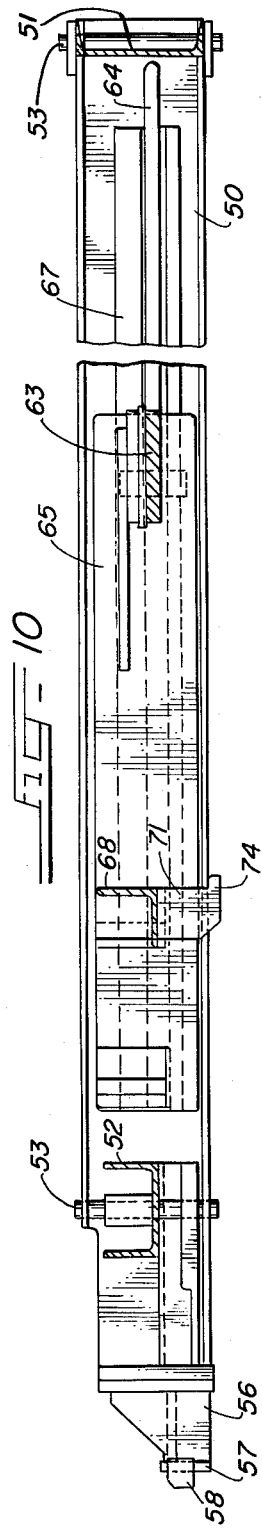
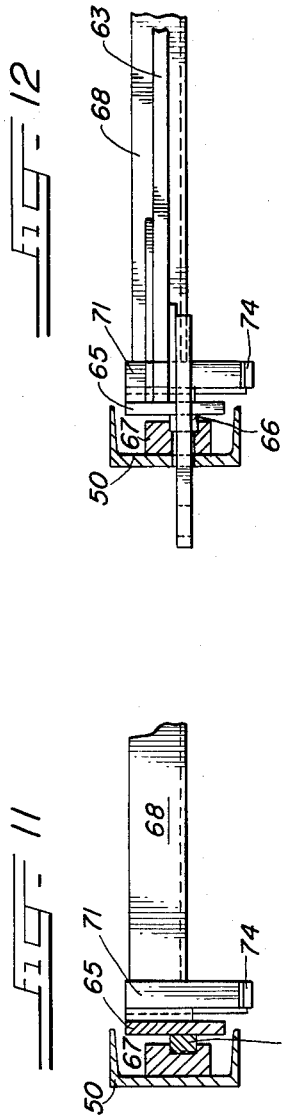
INVENTOR.
RAYMOND M. SHAVER June 28, 1966 R. M. SHAVER 3,257,844
SILL TESTING MECHANISM FOR CUSHION CARS
Filed Feb. 24, 1964 9 Sheets-Sheet 8
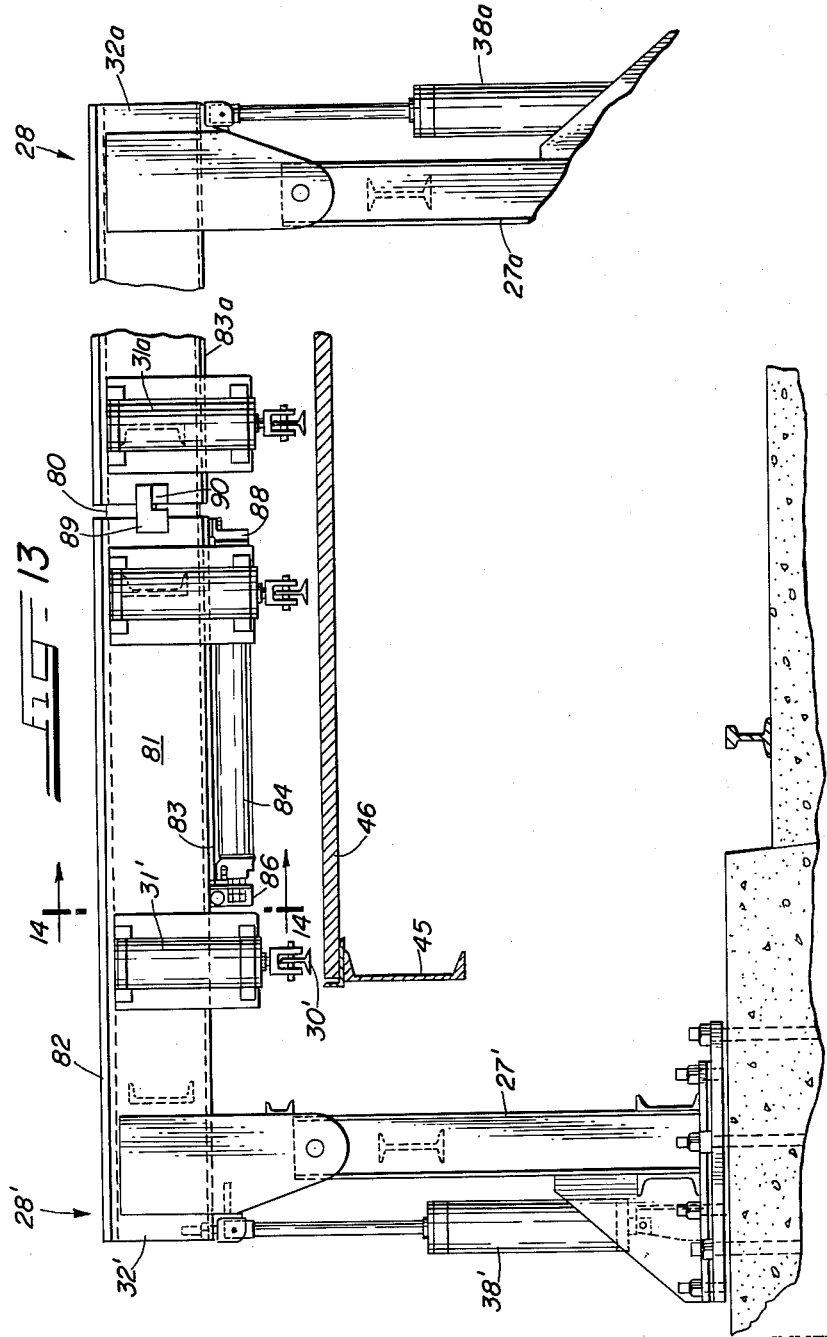
INVENTOR.
RAYMOND M. SHAVER

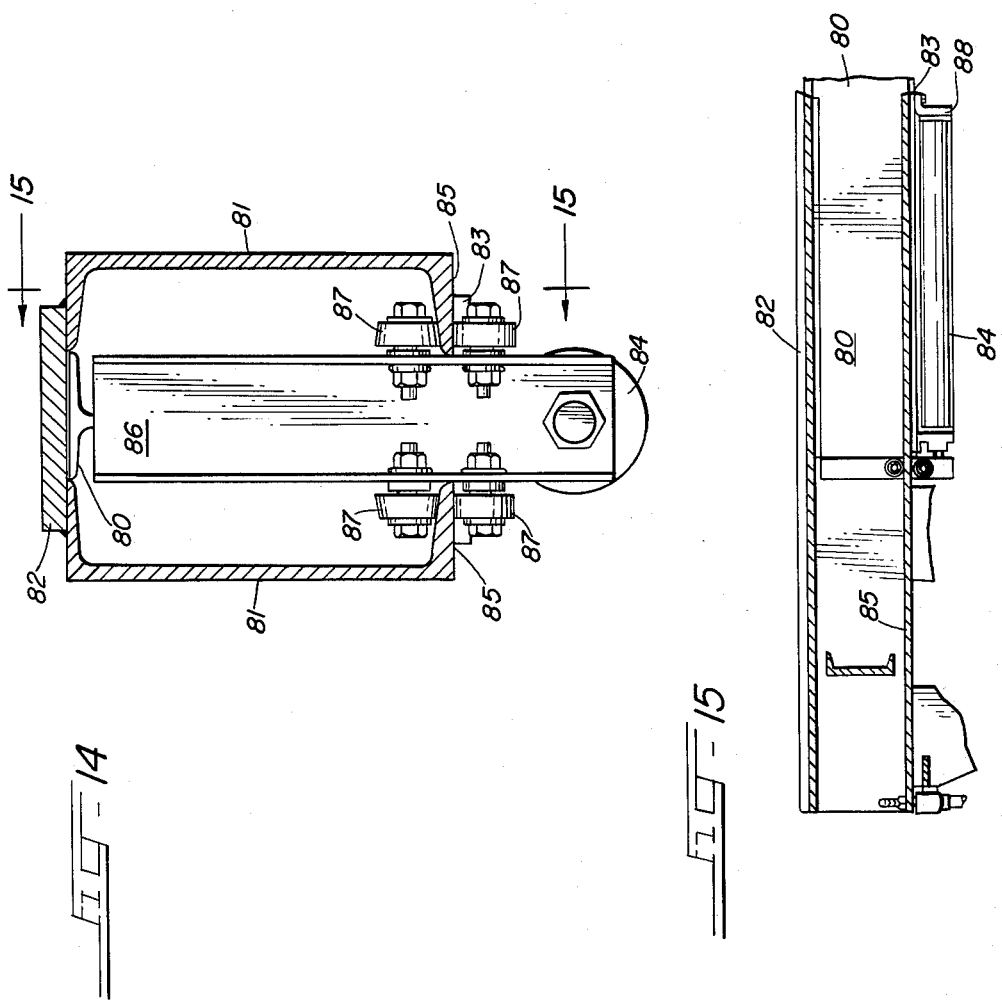

United States Patent Office 3,257,844
Patented June 28, 1966

3,257,844
SILL TESTING MECHANISM FOR
CUSHION CARS
Raymond M. Shaver, Michigan City, Ind., assignor to
Pullman Incorporated, Chicago, Ill., a corporation of
Delaware
Filed Feb. 24, 1964, Ser. No. 346,731
10 Claims. (Cl. 73—88)

The present invention relates to sill testing mechanism for cushion cars. Cushion cars are described in Peterson Patent 3,003,436, granted Oct. 10, 1961, and the present invention is described with respect to cushion underframe cars, although it is equally applicable to cushion body cars.

The distinguishing feature of a cushion underframe car is its sliding sill. This is mounted in the center sill of the underframe. In effect, it extends through the car and transmits the pull from one car to the next. The connection between the car body and the sliding sill is effected by a hydraulic device, something like a dash pot, which controls the rate of relative movement, and thus acts as a shock absorber or cushion. The hydraulic cushion acts only in compression, but the mounting is such that it functions to absorb impact in either direction; that is, it resists relative displacement of the parts to either side of a normal position. Thus, it is possible to restore the parts to normal position by a coil spring.

The object of the present invention is to provide a device for testing the sliding movement of the sliding sill, and this is done by displacing the sliding sill and then restoring it, or letting the coil spring restore it to its normal position. When it is considered that the underframe of a car constitutes a beam having a span of some 42 feet, for a 60-foot car for example, and that the load on the beam is of the order of tens of tons, it becomes apparent that a certain amount of deflection will take place which conceivably could cause a binding of, or interfere with the free sliding movement, of, the sliding sill.

However, the coil spring is so stiff that it is not possible to displace the sliding sill merely by pushing on it, even if the car wheels are blocked. Furthermore, the time consumed in loading the car to its rated capacity for testing purposes, and then in unloading it, represents a very substantial labor cost.

According to my invention the foregoing objectives are achieved in a speedy and expeditious manner by providing first, a load simulating device for deflecting the underframe, of which the center sill is a part, and secondly, a sill displacing device in the form of a hydraulic cylinder which reacts against the underframe rather than the ground and the car wheels. Furthermore, a rapid and direct displacing action is achieved by providing a sill displacing device in which the hydraulic cylinder is mounted in a frame, the operative portions of which can be interposed between the outer end of the sliding sill and the underframe and which exerts a push on the sliding sill in the reverse direction, as it were, to the end that the sliding sill is retracted from the underframe, rather than pushed into same.

Another object of the present invention is to provide convenient means for supporting the retractor frame so that it may be manipulated by the operator.

A still further object of the present invention is to provide sill testing mechanism in the form of a plurality of units which may be located along the side of a track section so that the car to be tested can be moved into a position opposite the respective units, the units then being movable into an operative position.

Still another object is to provide a loading device in the form of two oppositely disposed units which are movable between an inoperative position, in which they clear the car, and an operative position in which the mechanism extends through the door of the car. In this connection, the loading device includes means for locking the mechanism in its operative position in such a manner as to provide proper reaction for the extremely heavy forces involved.

Other objects, features and advantages will become apparent as the description proceeds.

With reference now to the drawings in which like reference numerals designate like parts:

FIG. 1 is an elevation of the complete installation of a preferred embodiment of my invention;

FIG. 2 is a perspective view of the installation of FIG. 1, without the car;

FIG. 3 is a view similar to FIG. 2 but showing the car in position for testing;

FIG. 4 is a transverse elevation of the loading device, taken substantially along line 4—4 of FIG. 1, and also showing certain parts of the car;

FIG. 5 is a left side view of the loading device shown in FIG. 4, omitting the car parts;

FIG. 6 is a right side view of the loading device shown in FIG. 4 (the cylinder 38–38a being omitted for clarity);

FIG. 7 is a plan view of the retractor frame;

FIG. 8 is a side elevation thereof;

FIG. 8a is a fragmentary perspective view of one end of the sliding sill and stationary center sill assembly;

FIG. 9 is a left end view of FIG. 8;

FIG. 10 is a longitudinal section taken along line 10—10 of FIG. 7;

FIG. 11 is a fragmentary transverse section taken along line 11—11 of FIG. 7;

FIG. 12 is a fragmentary transverse section taken along line 12—12 of FIG. 7;

FIG. 13 is a view similar to FIG. 4 but showing a modified type of loading device;

FIG. 14 is a vertical section of one of the beams of the pivoted head of the loading device taken along line 14—14 of FIG. 13; and FIG. 15 is a section of same taken along line 15—15 of FIG. 14, showing the locking bolt in elevation.

As shown in FIGS. 1 to 3, the sill testing mechanism comprises two end units 20 and two center units 21 which are positioned ath the ends and at the doors, respectively, of a freight car 22 of the cushion underframe type.

The characteristic of this car is that it has a slidably mounted sill 23 located within the stationary center sill 24, as shown in FIGS. 8a and 4. As previously explained, the purpose of the sill testing mechanism is to see whether the sliding sill 23 will move freely, that is, without binding, when the car is loaded. To this end, the two center units 21 constitute a loading device which apply a load, that is, a downwardly directed force, to the floor of the car which force is of a magnitude which deflects the center sill by an amount which is equal to the deflection of the center sill when the car is loaded to its capacity. For instance, for a 70-ton car, the load will be approximately 32 tons, which is more or less concentrated in a small area of about 6 by 9 feet at the center of the car.

Each end unit 20 comprises a jib crane 25 which suppots a rectractor frame 26. Each center unit comprises a standard 27 and a pivotally mounted head 28 which is arranged to extend through the door 29 of the car 22.

As shown in FIGS. 4 to 6, the head 28 carries two loading rails 30 whch extend longitudinally of the car, and transversely of the I-beams 32 of the head 28. The rails 30 are supported from the I-beams 32 by means of hydraulic cylinders 31, there being a pivotal connection at 31a, as shown in FIG. 5.

The head 28 is in the form of a rectangular frame which includes the two I-beams 32 and two or more cross spacers 33 together with support ears 34 which extend downwardly and are mounted on the vertical I-beams 35 of the standard 27. The I-beams 35 are firmly set in a massive concrete foundation 36. A hydraulic cylinder 38 plus piston rod 38a connects the lower part of the standard 27 with the support ears 34 so that the head 28 may be rocked about its pivot 37, thus providing a means by which the loading rails 30 and their associated parts may be extended through the door of a car.

In order to lock the head 28 in its operative position, a blocking frame 40, shown in FIGS. 4, 6 and 2 is provided which swings up under the tail portion 39 of the pivoted head 28. The blocking frame 40 is preferably formed of vertical members which are pivotally mounted at 41 on a mounting plate 42 which is anchored to the foundation 36. A hydraulic cylinder 43 swings the blocking frame 40 between its blocking position as shown in FIG. 4, and a retracted position somewhat to the right thereof, as shown in FIG. 2.

In operation, the car is moved along the track 44 to a position where its doors 29 are opposite the center units 21 which at that time are vertically disposed as shown in FIG. 2. Then the heads 28 are rotated into the horizontal position, as shown in FIGS. 3 and 4. The hydraulic pressure is applied to the cylinders 31 which thus load the center sill 24 of the car underframe as well as the side sills 45, the loading rails 30 bearing against the floor structure 46 of the car. The blocking frame 40 has been swung up into its operative position prior to the application of hydraulic pressure so as to provide a reaction point for the loading forces.

After the sill has been loaded, first one end of the sliding sill 23 is retracted, and then the other end, the retraction being effected by the retractor frame 26.

As shown in FIG. 7 the retractor frame 26 comprises two longitudinal channel members 50, a rear cross member channel 51, and a front cross member channel 52, the cross members being shown in section in FIG. 10. The parts are associated by connecting pins 53. At the front end of the longitudinal members 50 are vertical end plates 54 which extend inwardly and which are reinforced by flanged plates 55. Mounted on the front surface of the end plates 54 are brackets 56, the outer end of each of which constitutes a pressure pad 57 adapted to engage the edges of the center sill 24 at its upper corners 59, as shown in FIGS. 4 and 8a. The pressure pad has secured to it a locking lug 58 in the form of a plate welded to the side edge of the pressure pad 57 which extends into the center sill, as indicated by the broken lines 58 of FIG. 4.

An inner frame 62 is slidably mounted in the outer frame 50–51–52, and comprises a cross head 63 at the rear which extends through slots 64 formed in the longitudinal members 50. The inner frame also includes side plates 65 (FIGS. 11 and 12) which are secured to the cross head 63, and a front cross member 68.

The side plates 65 carry a key 66 which slides in a grooved guide block 67, the latter being welded to the inner surface of the longitudinal channel members 50.

The front cross member 68 is in the form of an angle (FIG. 10) which carries at its ends projections 69 which fit into a socket 70 mounted on the longitudinal members 50. A plurailty of such sockets 70 are provided and the cross member is removable so that its position may be shifted.

A pressure pad 71 is carried at each end of the cross member 68 which engages the striker plate 72 of the enlarged portion or bell 73 (FIG. 8a) of the sliding sill 23, the bell being the structure in which the coupler (not shown) is pivotally mounted.

The pressure pad 71 is provided with a locking lug 74 (FIGS. 8 and 10) which engages the underside of the striker plate 72.

Hydraulic cylinders 75 are mounted externally of each longitudinal member 50 by means of suitable brackets 76 located at both ends. The piston 77 of the cylinders is connected to the ends of the cross head 63 by pivot pins 78. Thus, hydraulic pressure applied to the cylinders 75 will cause the inner frame 62 to move rearwardly, that is, to the right, as viewed in FIGS. 7 and 10, in order to retract the sliding sill 23.

The retractor frame 26 is supported by means of a suitable chain 79, and is located over the projecting end of the sliding sill 23. The method of suspension, including the chain and the jib crane permit the operator to lower it until the front cross channel 52 and the front cross member 68 rest on the sliding sill 23. The device is positioned so that the pressure pads 57 engage the corners 59 of the stationary center sill 24, and then the hydraulic pressure is applied gradually to the cylinders 75 until the front cross member 68 is moved rearwardly into engagement with the striker plate 72. The retractor frame 26 is manipulated during this period so that the interlocking lugs 58 are interlocked with the stationary sill 24 and so that the interlocking lugs 74 will hook under the edges of the striker plate 72. After the parts are thus engaged the hydraulic pressure is increased which causes the inner frame 62 to move to the right, as shown in FIG. 7, for the rated travel distance, such as 30 inches. If there is any obstruction to free movement, it will be observed at this time, and if there is any binding it will be detected by a scraping noise or by chattering. After the center sill has been retracted through the rated distance, the pressure within the cylinders 75 is released, and the coil spring (not shown) of the cushion mechanism is permitted to return the center sill to its normal position and the inner frame 62 to its initial position, although the pressure within the cylinder may be reversed, if desired, to speed up return movement of the latter, these being double acting cylinders.

In the modified loading device of FIG. 13, the heads 28' are locked in their operative position by means of a locking bolt 80 mounted within each one of the beams 32'. As shown in FIG. 14, the beam 32' is a fabricated box beam made up of two channels 81 secured to each other by a top plate 82 and a bottom plate 83. The locking bolt 80 is slidably mounted between the two channels 81 and is acutated by a hydraulic cylinder 84 so that the bolt may be projected beyond the end of the beam 32' and received within the corresponding beam 32a of the other center unit 21.

The locking bolt 80 is in the form of an I-beam, and the inner end thereof rides on the bottom plate 83 of the beam 32', and on the corresponding bottom plate 83a of the beam 32a. The bottom plate 83 terminates short of the inner end of the beam 32' so that a slot is formed between the lower flanges 85 of the channels 81. A vertically extending bracket 86 is secured to the outer end of the locking bolt 80 and extends downwardly between the flanges 85. Rollers 87 are mounted on the bracket 86 and engage the opposite sides of the flanges 85 so that the inner end of the locking bolt 80 may be supported when the bolt is in its retracted position.

The piston end of the hydraulic cylinder 84 is connected to the bracket 86, and the other end is supported by a bracket 88 mounted at the inner end of the beam 32'.

Aligning lugs 89 and 90 are mounted on the beams 32' and 32a respectively so that the openings in the beams may be aligned.

To summarize the operation which has been previously described in detail in the description of the various parts and assemblies, the parts are initially arranged as shown in FIG. 2, with the swinging booms 91 of the end units 20 arranged parallel to the track 44, and with the heads 28 of the center units 21 tilted up, so that the track 44 is clear. Then the car 22 is moved into place, the heads 28 swung down into the horizontal position, through the doors 29, and the blocking frames 40 are swung up into position. Then the hydraulic pressure is applied to cylinders 31 to load the underframe.

Then, first one end of the sliding sill 23 is retracted, and then the other. The jib crane 25 is provided with a swinging boom 91 which carries a hoist 92, the chain 79 being connected to the hoist. Thus, it is possible, by swinging the boom 91, to bring the retractor frame 26 into position over the sliding sill 23, and the hoist 92, in combination with the fact that the retractor frame 26 is freely suspended by the chain 79, permits a single operator to readily manipulate the heavy retractor frame 26 so that the lugs 58 and 74 are properly interlocked with the parts 59 and 72. The interlocking arrangement prevents the retractor frame from snapping out of engagement with the sliding sill and the center sill when the pressure is applied to the hydraulic cylinders 75.

After one end of the sliding sill 23 has been retracted, and then permitted to return to its normal position, and if no binding has been detected then the retractor frame 26 at the first end is removed, and the other end of the sliding sill 23 is retracted and permitted to return in a similar manner.

Then both retractor frames 26 are swung to one side, and the pressure relieved from the loading rails 30 by reversing the pressure in hydraulic cylinders 31. Then the blocking frames 40 are swung to one side, and the heads 28 swung out of the doors 29, after which the car 22 may be removed and another car brought into position for testing.

The whole testing operation can be completed by one operator in less than half an hour, representing a saving of many man hours which would otherwise be required if the car were to be loaded with weights. Furthermore, by retracting the sill, rather than pushing it in, it is possible to test one end of the sill by equipment located at that end of the car, and it does not require heavy equipment which reacts against the ground or track section 44. As previously pointed out, the operation cannot be performed merely by wheel blocking, due to the stiffness of the return spring. Hence a pushing operation would require a firmly anchored reaction point at the opposite end of the car if the sill were to be pushed in instead of retracted.

Although only preferred embodiments of my invention have been shown and described herein, it will be understood that various modifications and changes may be made in the construction shown without departing from the spirit of my invention as pointed out in the appended claims.

I claim:

1. Sill testing mechanism for a cushion car comprising a loading device mounted for location opposite the doors of a freight car, and an end unit mounted for location at one end of the car, said loading device comprising a standard, a head mounted on said standard and movable between a displaced position wherein it is clear of the car, and an operative position wherein it extends through the door of the car, floor engaging means carried by said head, and hydraulic cylinder means connected to said floor engaging means to said head and urging said floor engaging means downwardly into engagement with the floor of said car for deflecting the underframe thereof, said end unit comprising a retractor frame including a front cross member, a cross head slidably mounted in said retractor frame, hydraulic cylinder means mounted on said retractor frame and engaging said cross head for causing movement of said cross head away from said front cross member, sill engaging means connected to said cross head, and means supporting said retractor frame so that the same may be positioned with its front cross member engaging the underframe of said car and with said sill engaging means engaging the sliding sill of said car.

2. Sill testing mechanism as claimed in claim 1 in which said retractor frame supporting means comprises a jib crane having a swinging boom, hoist means mounted on said boom, and means suspending said retractor frame from said hoist means.

3. Sill testing mechanism for a cushion car comprising a loading device mounted for location opposite the doors of a freight car, and an end unit mounted for location at one end of the car, said loading device comprising a standard, a head pivotally mounted on said standard and rotatable between an upright position wherein it is clear of the car, and a horizontal position wherein it extends through the door of the car, loading rails disposed beneath said pivoted head when said head is in its horizontal position, means for locking said pivoted head in said horizontal position, and hydraulic cylinder means connected to said loading rails and said pivoted head for urging said loading rails downwardly into engagement with the floor of said car for deflecting the underframe thereof, said end unit comprising a retractor frame including a front cross member, a cross head slidably mounted in said retractor frame, hydraulic cylinder means mounted on said retractor frame and engaging said cross head for causing movement of said cross head away from said cross member, sill engaging means connected to said cross head, and means supporting said retractor frame so that the same may be positioned with its front cross member engaging the underframe of said car and with said sill engaging means engaging the sliding sill of said car.

4. A sill retracting device for use in sill testing mechanism comprising an outer frame which includes a front cross member and two side members, slots formed in the rear portion of said side members, a cross head slidably mounted in said outer frame and having end portions projecting through said slots, said cross head forming a part of a slidably mounted inner frame which also includes side plates secured to said cross head, and an inner frame front cross member, key and groove means connecting said side plates and said outer frame side members for longitudinally sliding movement, said outer frame front cross member including forwardly facing pressure pads for engaging the stationary center sill of a car, and said inner frame including rearwardly facing pressure pads for engaging the striker plate of a sliding sill, and hydraulic cylinder means mounted on the external side of each of said longitudinal side channels and having piston means connected to said cross head for urging said inner frame in the rearward direction.

5. A sill retracting device as claimed in claim 4 in which said forwardly facing pressure pads are each provided with a projecting lug for interlocking with the corners of the center sill of a car, and in which said rearwardly facing pressure pads are formed with a projecting lug which hooks under said striker bar.

6. A sill retracting device as claimed in claim 4, in which said outer frame includes a rear channel member, and pins connecting said rear channel member to said side channel members and said front channel member to said side channel members to permit seating of said forwardly facing pressure pads on said stationary center sill.

7. A sill retracting device for use in sill testing mechanism comprising a rectangular frame which includes a front cross member and two side channels, slots formed in the rear portion of said side channels, a cross head slid- on the inner surface of said side plates, and a cross member jecting through said slots, forwardly extending side plates secured to said cross head forming a U-shaped structure, key and groove means connecting said side plates and said side channels for longitudinally sliding movement, a plurality of oppositely disposed pairs of sockets mounted on the inner surface of said plates, and a cross member removably mounted in one of said socket pairs, said front cross member including means for engaging the stationary center sill of the car to be tested, said removable cross member including means for engaging the sliding sill of said car, and hydraulic cylinder means mounted on the external side of each of said longitudinal side channels and having piston means connected to said cross head for urging said U-shaped member in the rearward direction.

8. A loading device for use in sill testing mechanism comprising a standard, a head pivotally mounted on said standard and movable between a substantially vertical position and a horizontal position, ears mounted on said head and providing the pivoted connection between said head and said standard, hydraulic cylinder means extending between said ears and said standard for rocking said head, said head comprising a pair of spaced beam members, a pair of hydraulic cylinders mounted on each beam member, a pair of loading rails disposed transversely of said beam members and supported by said hydraulic cylinders, and arranged beneath same when said head is in its horizontal position, said head having a tail portion extending beyond said ear portions, a vertically disposed blocking frame, a base on which said blocking frame and standard are mounted, said blocking frame being pivotally mounted on said base for tilting movement between an operative position in which it underlies said tail portion, and an inoperative position in which it clears said tail portion, whereby said blocking frame provides a reaction point for said pivoted head when said loading rails are urged downwardly into engagement with the floor of a car by said beam mounted hydraulic cylinders.

9. A loading device for use in sill testing mechanism adapted for installation along a track section, comprising a pair of standards located opposite each other on either side of said track section, a head pivotally mounted on each standard and movable between an upright position wherein it is clear of a car located on said track section and a horizontal position wherein it extends through the doors of said car, the ends of said heads being oppositely disposed and closely spaced from each other when in said horizontal position, loading rails associated with each pivoted head, hydraulic cylinder means connecting said loading rails and said pivoted head for urging said loading rails downwardly into engagement with the floor of said car, each of said pivoted heads comprising a pair of box beams disposed transversely of said track section, a bolt slidably mounted in one box beam of one of said heads, and means for moving said sliding bolt outwardly into the oppositely disposed box beam of said other head in order to provide a continuous beam extending between said oppositely disposed pair of standards against which said hydraulic cylinders react when said loading rails are urged downwardly.

10. A loading device as claimed in claim 9 which includes aligning lugs mounted on said oppositely disposed box beams so that said beams may be horizontally aligned with each other as said oppositely disposed heads are moved into their horizontal position.

References Cited by the Examiner
UNITED STATES PATENTS

| | | | |
|---|---|---|---|
| 1,787,675 | 1/1931 | Faus | 73—11 |
| 2,431,295 | 11/1947 | Eksergian et al. | 73—88 |

RICHARD C. QUEISSER, *Primary Examiner.*

G. M. GRON, *Assistant Examiner.*